United States Patent [19]

Letcher, III

[11] Patent Number: 5,253,530
[45] Date of Patent: Oct. 19, 1993

[54] METHOD AND APPARATUS FOR REFLECTIVE ULTRASONIC IMAGING

[76] Inventor: John H. Letcher, III, 7421 S. Marion, Tulsa, Okla. 74136

[21] Appl. No.: 743,727

[22] Filed: Aug. 12, 1991

[51] Int. Cl.$^5$ ............................................. G01N 29/22
[52] U.S. Cl. .................................... 73/602; 128/660.06
[58] Field of Search ............................. 73/602, 597; 128/660.06

[56] References Cited

U.S. PATENT DOCUMENTS

| | | | |
|---|---|---|---|
| 5,000,-83 | 3/1991 | Bonnefous | 73/602 |
| 4,074,564 | 2/1978 | Anderson | 73/602 |
| 4,121,468 | 10/1978 | Glover et al. | 128/660.06 |
| 4,676,250 | 6/1987 | Barnes | 128/660.06 |
| 4,913,157 | 4/1990 | Pratt, Jr. et al. | 73/597 |
| 4,941,474 | 7/1990 | Pratt, Jr. | 128/660.06 |

FOREIGN PATENT DOCUMENTS 0202694  11/1986  European Pat. Off. ....... 128/660.06

OTHER PUBLICATIONS

"Ultrasonic Imaging in Solids" by M. G. Maginness and Professor L. Kay (Feb. 1971) The Radio and Electronic Engineer, vol. 41, No. 2 (pp. 91-93).

Primary Examiner—Hezron E. Williams
Assistant Examiner—Rose M Finley

[57] ABSTRACT

A method and related system for use in producing a representation of acoustical impedances of body materials, such as for use in ultrasonic imaging of a body for diagnostic purposes. In the method, at least one Letcher Wavelet ($L^M$) of ultrasonic energy is introduced into the body to be diagnosed. The reflections of the ultrasonic energy are received by a transducer and sent to a CPU for transformation. The received reflections are transformed, using a technique cooperative with the characteristics of the $L^M$ wavelet, to produce a representation of the acoustical impedances from the body materials. Such representation can be in the form of data, graphical or an image, such as on a CRT. Further, the representation can be in the form of the density of the body materials or the velocity of sound through the body materials.

10 Claims, 11 Drawing Sheets

The Haar Wavelet  The L-Wavelet for M = 2 and N = 16

The Wavelet Transform (for $N = 16$, $J = 4$)

$$\begin{bmatrix} f_1 \\ f_2 \\ f_3 \\ f_4 \\ f_5 \\ f_6 \\ f_7 \\ f_8 \\ f_9 \\ f_{10} \\ f_{11} \\ f_{12} \\ f_{13} \\ f_{14} \\ f_{15} \\ f_{16} \end{bmatrix} \Longleftrightarrow \begin{bmatrix} \phi(1-x) \\ W(1-x) \\ W(1-2x) \\ W(2-2x) \\ W(1-4x) \\ W(2-4x) \\ W(3-4x) \\ W(4-4x) \\ W(1-8x) \\ W(2-8x) \\ W(3-8x) \\ W(4-8x) \\ W(5-8x) \\ W(6-8x) \\ W(7-8x) \\ W(8-8x) \end{bmatrix} \begin{array}{|c|c|} \hline b_\phi & a^0 \\ \hline b_0 & b^0 \\ \hline b_{11} & \multirow{2}{*}{b^1} \\ b_{12} & \\ \hline b_{21} & \\ b_{22} & \multirow{2}{*}{b^2} \\ b_{23} & \\ b_{24} & \\ \hline b_{31} & \\ b_{32} & \\ b_{33} & \\ b_{34} & b^3 \\ b_{35} & \\ b_{36} & \\ b_{37} & \\ b_{38} & \\ \hline \end{array} \begin{array}{|c|c|} \hline 0 & \\ \hline a_0 & a^0 \\ \hline a_{11} & \multirow{2}{*}{a^1} \\ a_{12} & \\ \hline a_{21} & \\ a_{22} & a^2 \\ a_{23} & \\ a_{24} & \\ \hline a_{31} & \\ a_{32} & \\ a_{33} & \\ a_{34} & a^3 \\ a_{35} & \\ a_{36} & \\ a_{37} & \\ a_{38} & \\ \vdots & \overline{a^4 \equiv F} \end{array}$$

$$E = \frac{1}{2} \updownarrow l \begin{bmatrix} \gamma c_1 & \gamma c_0 & 0 & 0 & 0 & 0 & 0 & 0 \\ c_3 & c_2 & c_1 & c_0 & 0 & 0 & 0 & 0 \\ 0 & 0 & c_3 & c_2 & c_1 & c_0 & 0 & 0 \\ 0 & 0 & 0 & 0 & c_3 & c_2 & c_1 & c_0 \end{bmatrix} \xleftrightarrow{2l}$$

$^nE$ is $l \times 2l$ where $2l = 2^n$ ($^3E$ is $4 \times 8$)

$(E)_{ij} = c_{2i-j} / 2$ $\qquad$ $(E^*)_{ji} = c_{2i-j}$ $\gamma = 4 / (2 + \sqrt{3})$ $\qquad$ $\gamma = 1$

$$H = \frac{1}{2} \updownarrow l \begin{bmatrix} c_0 & -c_1 & -c_2 & -c_3 & 0 & 0 & 0 & 0 \\ 0 & 0 & c_0 & -c_1 & -c_2 & -c_3 & 0 & 0 \\ 0 & 0 & 0 & 0 & c_0 & -c_1 & -c_2 & -c_3 \\ 0 & 0 & 0 & 0 & 0 & 0 & \gamma c_1 & \gamma c_0 \end{bmatrix} \xleftrightarrow{2l}$$

$$a^{K-1} = {}^K L\, a^K \;,\; b^{K-1} = {}^K H\, a^K \;,\; K = 1, \ldots, J$$

FIG. 8

$$a^K = {}^K E^* \, a^{K-1} + {}^K H^* \, b^{K-1} \quad , \quad K = 1, \ldots, J$$

METHOD AND APPARATUS FOR REFLECTIVE ULTRASONIC IMAGING

BACKGROUND OF THE INVENTION

1. Field of the Invention

The present invention relates to methods and related systems for producing a representation of acoustical impedances of materials and, more particularly, to such methods and systems that use ultrasonic energy for medical diagnostic purposes.

2. Setting of the Invention

The use of ultrasonic energy to obtain meaningful information about the internal structure and condition of living organisms has been a great advance over prior invasive techniques. Over the past number of years the use of ultrasonic energy for such medical diagnostic purposes has greatly increased, yet the information being presented to the operator, usually in the form of a visual image, is still very difficult to interpret. A skilled operator is needed for the interpretation of the image. There is a great need for a method and system that can improve the quality and detail of the image so that better medical diagnoses can be obtained.

Conventional ultrasonic imaging devices fall into a number of categories. Some of these are used to study systems containing boundaries where the acoustic impedance, Z, of a material ($Z = \rho v$, where $\rho$ is the density and v is the velocity of sound in the material) differs greatly from one material to the next. In such a system, the reflections are distinct and multiple reflections are common. In systems such as living tissue the difference of impedance from one material to the next (such as from muscle to fat) make for reflections that are difficult to detect and differentiate. Research is being conducted to find ways to improve the signal processing of these signals, but also into ways to improve the signal that is sent into the body.

Ultrasonic imaging usually uses a piezoelectric crystal that is placed against the body to be imaged. The crystal is subjected to a single voltage spike (~200 volts for a duration of tens of nanoseconds). The crystal deforms along the electric field and because of the contraction and dilation of the crystal, it produces sound at one end of the crystal. The other end of the crystal is held firmly by a sound absorbing material, such as a plastic with heavy metal particles imbedded in the plastic.

Although the impressed voltage is well defined, the crystal is not particularly cooperative in tracking the applied voltage. What is seen are multiple oscillations which usually dampen out in four or five cycles at a frequency determined by the physical characteristics of that particular crystal.

Conventional imaging devices either view the raw ultrasonic signal received from the body or employ techniques based on the fourier transform to yield an image. One fourier technique uses the calculation of a correlation function which tries to decompose the received signal into a sequence of the transmitted signal. Phase cancellation of one reflection with another make this signal extremely difficult to analyze by fourier techniques. A map of the raw signal of a perfectly sharp boundary produces an imprecise blur at least to the extent that the transmitted signal is smeared in time. There is a need for a method and related system for transmitting a signal from a crystal that can be more precisely created, in order to be more precisely detected and imaged.

SUMMARY OF THE INVENTION

The present invention has been developed to overcome the foregoing deficiencies and meet the above described needs. Specifically, the present invention creates a signal according to the constraints of the particular crystal, and that has enhanced properties that are then utilized when the reflections of that signal are to be converted into an image. As will be described herein, far greater definition of images and other useful information can be obtained using the present invention than what has been obtained heretofore.

In the method and related system of the present invention, at least one wavelet of ultrasonic energy is introduced into a body. The wavelet is a specific mathematically defined wavelet termed $L^M$ having particular properties, as detailed herein. The reflections of the introduced ultrasonic energy from the body materials are received at the transmitting transducer or at a separate transducer. The reflections are transformed using a specific transformation process, which is cooperative with the properties of the $L^M$ wavelet, to produce a representation of acoustical impedances from the body materials. These representations can take the form of visual images or data that detail acoustical impedances, density of body materials and velocity of sound through body materials.

DETAILED DESCRIPTION OF THE PREFERRED EMBODIMENTS

Figure 1:
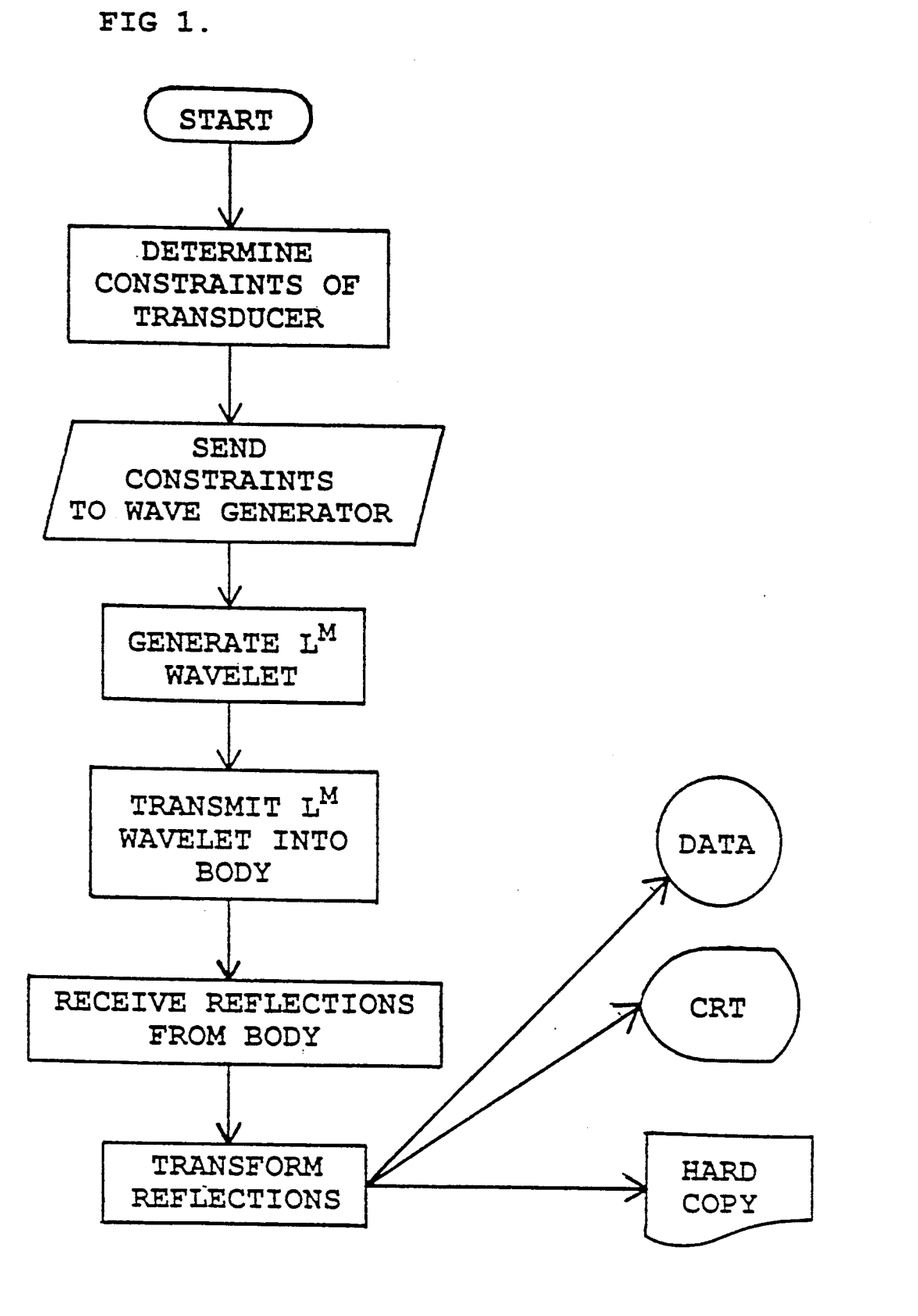
FIG. 1 is a flow chart detailing one method of the present invention.

As briefly described above, the present invention is a method and related system for producing a representation of acoustical impedances of materials within a body. Specifically, at least one wavelet of ultrasonic energy is introduced into the body. The wavelet has a very specific shape, and is created in a manner that takes into account the physical constraints of the particular transmitting crystal to ensure that the transmitted wavelet has the very specific shape. After the wavelet has entered the body, material interfaces cause some of the energy of the wavelet to be reflected, these reflections are received at a transducer and passed to devices, associated with programmable digital computers, that transform the reflections into representations of acoustical impedances of the body materials. The method of the present invention is shown in flow chart form in FIG. 1.

The description of the preferred embodiments of the present invention will be broken into several chapters for ease of understanding. These chapters are as follows: Integral Transforms, Wavelet Transformations, Scaling Functions, Function Decomposition, Interpretation of A and B Arrays, Imaging Device, and Imaging Process.

Integral Transforms

By way of background, the set of equations $$g(a) = \int_{I_1} K_1(x, a) h(x) \, dx \quad (1)$$

$$h(x) = \int_{I_2} K_2(x, a) g(a) \, da \quad (2)$$

defines an integral transform pair. The function g(a) is called the transform of h(x) and the variables x and a are called conjugate variables.

To define a specific (named) transform, the two Kernel functions $K_1(x,a)$ and $K_2(x,a)$ must be defined. Similarly, the interval over which each integration is carried out must be specified. Finally, something must be stated with regard to the properties of the functions g and h for the transform and its inverse to exist.

The Fourier transform is defined by $$K_1 = (2\pi)^{-\frac{1}{2}} \exp(-ixa), \quad (3)$$

$$K_2 = (2\pi)^{-\frac{1}{2}} \exp(+ixa), \quad (4)$$

$$I_1 = [-\infty, +\infty], \quad (5)$$

and $$I_2 = [-\infty, +\infty]. \quad (6)$$

It is sufficient that $$\int_{I_1} |h(x)|^2 \, dx < \infty \quad (7)$$

and $$\int_{I_2} |g(a)|^2 \, da < \infty \quad (8)$$

for the transform and its inverse to exist.

Please notice that the set of basis functions {exp (inx)}, n=0, ±1,... are orthogonal. Also note that both intervals are infinite in extent. For use on a digital computer, it would be preferable to use finite intervals (i.e. basis functions of finite or even compact support).

One can convert the infinite fourier transformation to the finite discrete fourier transformation. However, in the process, one must now assume that the function one wishes to transform is periodic on the interval of the discrete transform. This is not always the case, so the transform will now have error associated with it from the onset.

For the purposes of the present invention, it is preferable to use an integral transform that has the following properties:

1) The basis functions are nonzero only over a finite interval (compact support).
2) The basis functions are orthonormal (orthogonal and normalized).
3) The decomposition/reconstruction (transform/inverse transform) algorithms should be efficient and if recursive, rapidly converging.

Wavelet Transformations

A wavelet transform extends the notion of an integral transform and adds another level of spectral resolution. Rather than the transform being a function of one conjugate variable, it is to have a pair of conjugate variables, thus $$g(a,b) = \frac{1}{|a|^{\frac{1}{2}}} \int w\left(\frac{x-b}{a}\right) h(x) \, dx \quad (9)$$

$$h(x) = \frac{1}{2\pi C_w} \iint w\left(\frac{x-b}{a}\right) |a|^{-\frac{1}{2}} g(a,b) \frac{da \, db}{a^2} \quad (10)$$

where $$C_w = \int d\zeta \, |\hat{w}(\zeta)|^2 \zeta^{-1} \quad (11)$$

and $$\hat{w}(\zeta) = (2\pi)^{-\frac{1}{2}} \int e^{-ix\zeta} w(x) \, dx \quad (12)$$

The parameters a and b can be chosen to vary continuously (a, b ∈ R with a≠0) or in a discrete way (a=$a_o^m$, b=n $b_o a_o^m$, with m, n ∈ Z (i.e. m and n are integers) and with $a_o > 1$ $b_o > 1$, invariant). The present invention preferably uses the latter.

Herein a wavelet transformation uses a "scaling function" which is defined in terms of a dilation equation which employ a set of expansion coefficients {$C_k$}. One can then build (using the set of expansion coefficients {$C_k$}) the wavelets out of a linear combination of these scaling functions. The wavelets form a complete orthonormal basis. Please understand that although the algorithms are given below to calculate these wavelets, it is not necessary to do so to calculate the transforms of experimental data and then to reconstruct.

Scaling Functions

Consider a scaling function $\phi(x)$ that has the following properties: given the dilation equation in terms of a set of coefficients $\{C_k\}$, $k = 0, 1, \ldots M-1$, then $$\phi(x) = \sum_{k=0}^{M-1} C_k \phi(2x - k) \tag{13}$$

It is required that $$\int \phi(x) dx = 1 \tag{14}$$

and that the coefficients are such that $C_k = 0$ for $k < 0$ and for $k \geq M$.

If one will multiply Eqn(13) by 2 and integrate over x, it can be shown that $$\sum_{k=0}^{M-1} C_k = 2 \tag{15}$$

It will be required that for some p, $$\sum_{k=0}^{M-1} C_k (-1)^k k^m = 0 \text{ for } m = 0, 1, \ldots, p-1 \tag{16}$$

Also, $$\sum_{k=0}^{M-1} C_k C_{k-2m} = 2 \delta_{om} \tag{17}$$

where $\delta_{om} = 1$ when $m = 0$ and 0, otherwise.

The function $\phi(x)$ can be evaluated by starting with a beginning function, $\phi_o(x)$ and iterating $$\phi_j(x) = \sum_{k=0}^{M-1} C_k \phi_{j-1}(2x - k), j = 1, \ldots \tag{18}$$

This will converge to the desired scaling function $\phi(x)$ at all diadic points $x = k/2^j$.

For the Haar wavelet $\phi_o(x) = 1$, $0 < x < 1$, 0 otherwise, and there are two nonzero coefficients, $C_o = 1$ $C_1 = 1$, that is $M = 2$ and $p = 1$. The convergence is immediate and $\phi = \phi_o$.

For the Daubechies scaling function $D_4(x) = \phi(x)$, we use $\phi_o(x) = 1$ when $0 < x < 1$, 0, other wise. And, one can use herewith only four nonzero coefficients, $C_k$. That is, $M = 4$, and $$C_0 = (1 + \sqrt{3})/4, C_1 = (3 + \sqrt{3})/4,$$

$$C_2 = (3 - \sqrt{3})/4, C_3 = (1 - \sqrt{3})/4$$

For the $D_4$ scaling function, $p = 2$.

Note that if there are recursion coefficients $C_o, \ldots, C_K$, then $\phi$ is zero outside the interval $[0, K]$. From continuity considerations, $\phi(0) = \phi(K) = 0$. (However, with the Haar wavelet with $K = 1$, both $\phi(0)$ and $\phi(1)$ may not be zero.)

Remembering that the scaling function, $\phi$, has M nonzero coefficients, $C_k$, one can now express a wavelet W(x) as $$W^M(x) \equiv W(x) = \sum_{n=0}^{M-1} (-1)^n C_n \phi(2x - 1 + n) \tag{19}$$

One can now define $$W_{jk}{}^M(x) \equiv W_{jk}(x) = 2^{j/2} W(k - 2^j x) \tag{20}$$

Out of these one can expand a function f(x) in terms of multi-resolution expansion coefficients $b_{jk}$, thus $$f(x) = f^\phi + \sum_{j,k} b_{jk} 2^{-j/2} W_{jk}(x), j = 0, \ldots k = 0, \ldots, 2^j \tag{21}$$

Note that $b_{jk}$ carries information about f near $x = 2^j$ and near $x = 2^{-j}k$. The sum on k is the detail at the scaling level, $2^j$.

It can be shown that these functions, or wavelets, are orthogonal to their own dilations and their own translations. That is, $$\int W(x) W(2^j x - k) dx = \delta_{jo} \delta_{jk}, k \epsilon Z \tag{22}$$

There are two indices, one for translation, k, and one for dilation (or compression), j.

It is not difficult to show that $$\int W(X) dx = 0 \tag{23}$$

which is a property that is essential for the transmitted ultrasound signal to have no dc offset.

Other wavelets may be formed by a linear combination of wavelets. That is, $$L^M = L_{jk}{}^M(x) = \sum_{n=1}^{m} d_n(j,k) W_{jk}{}^M(x) \tag{24}$$

Figure 2:
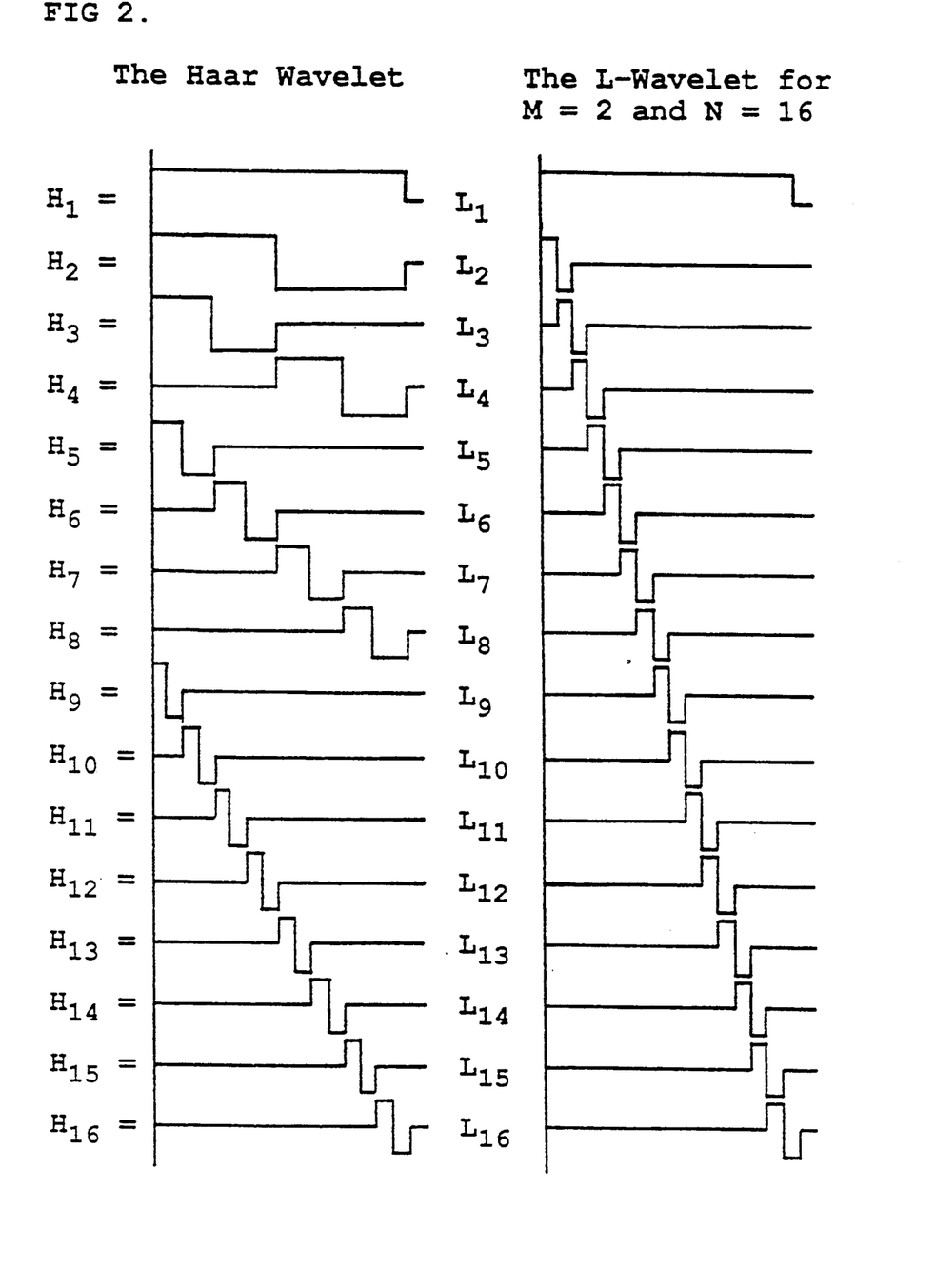
FIG. 2 is a plot of the lowest frequency Haar wavelet that is used in the practice of the present invention.
Figure 3:
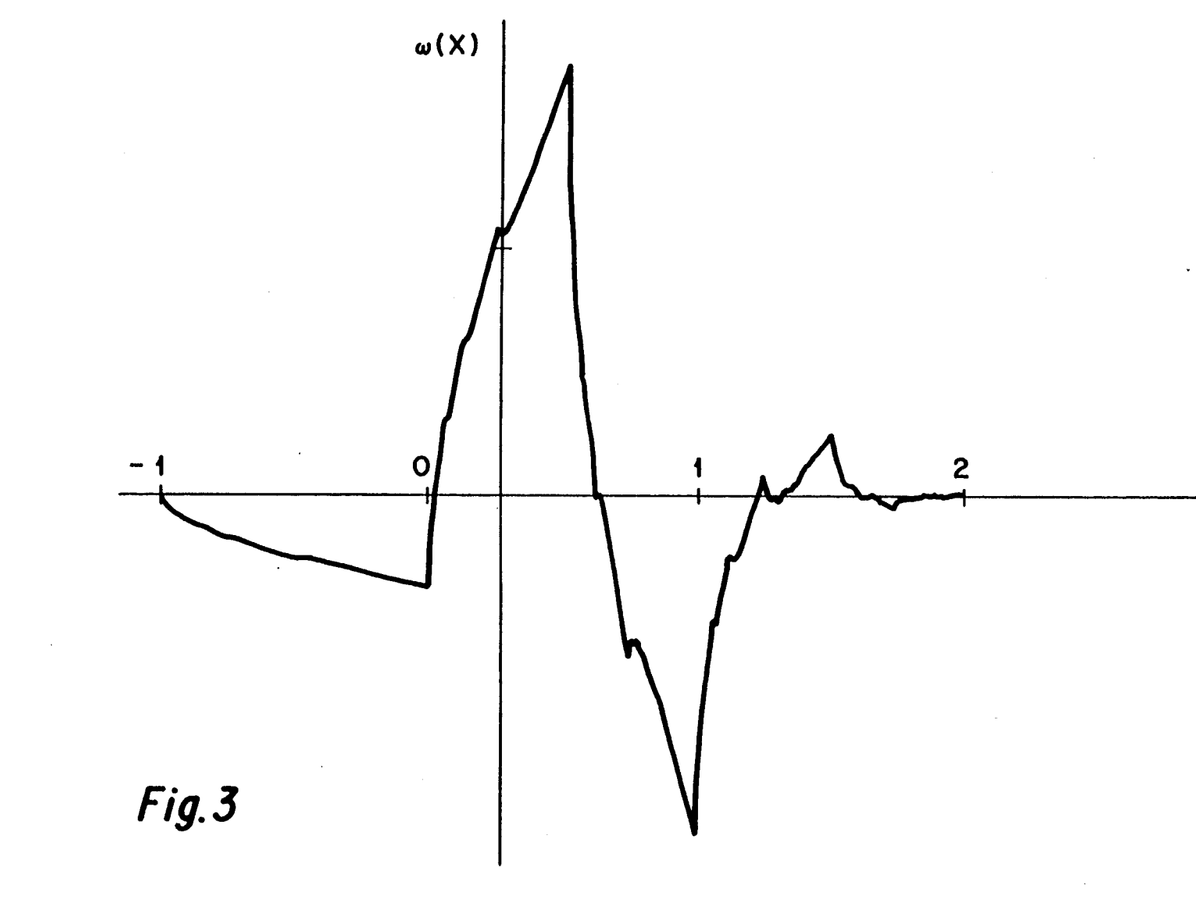
FIG. 3 is a plot of the lowest frequency wavelet utilizing $D_4$ scaling function in accordance with the present invention.

In order to achieve the wavelet properties listed in this section, it is found that the choice of the sets $\{C_k\}$ is far from arbitrary. Only special combinations of precise values are allowed, otherwise one or several of the desired wavelet properties will be lost. For ease of understanding, the specific wavelet forms that are to be used in the practice of the present invention will be defined as Letcher Wavelets or $L^M$, with the wavelets in the form generated by Equations 18, 19, 20 and ultimately 24 with $M = 2, 4, 6, \ldots$ For illustrative purposes, plots of the lowest sequency Haar wavelets are given in FIG. 2 and FIG. 3 gives a plot of the $D_4$ lowest sequency wavelet. Higher order wavelets are formed in a manner identical to the Haar wavelets by forming dilations and translations of the basic wavelet.

Turning now to the specific ultrasonic energy wavelet that is to be transmitted into the body, one must understand that commercially available ultrasonic transducers all possess resonances that make it impossible to feed a voltage signal to the transducer and have the transducer produce an amplitude which is proportional to the applied voltage. However, linear system theory provides a technique whereby a signal is sent to the transducer not in the form of what one wants to send out but is in the form designed to account for the precise manner in which the transducer will distort. Thus, the desired signal will be generated after all.

For example, consider the transducer to be a linear system with transfer function G(s). That is, given an input signal f(t) with Fourier transform F(s), i.e., $F(s) = FT(f(t))$, then the output signal h(t) can be calculated because the Fourier transform of h(t) which is H(s) is given by $H(s) = F(s) G(s)$. So, h(t) is the inverse Fourier transform of $F(s) G(s)$.

Also, the impulse response function of the system g(t) is the inverse Fourier transform of G(s), i.e., G(s)=FT(g(t)). Therefore, the output signal h(t) is the convolution of the impulse response function g(t) with the output signal f(t).

If one wants the transducer to produce a defined h(t), then the transducer is sent a signal generated by the signal production circuitry of the system, as well known how to do by those skilled in the art, in the form of f(t) rather than h(t). If this signal f(t) is defined to be the convolution signal f(t) as defined as the convolution of h(t) with $g^{-1}(t)$, then the transducer will produce h(t) as its output. This is equivalent to adding another system in series with an impulse response function $g^{-1}(t)$ to the system with the impulse response function g(t).

Therefore, given a specific ultrasonic transducer, it is now possible by way of the present invention to have it generate a wavelet, w(t), with the following procedure:

1. feed sharp or pointed voltage spike to the transducer and dampen the response so that there are no zeroes,
2. measure the signal generated by the transducer to obtain the impulse response of the transducer, g(t),
3. calculate f(t), which is the inverse Fourier transform of the product of $g^{-1}(t)$ and the Fourier transform of the desired wavelet, w(t), and
4. feed the signal $f(t)=FT^{-1}(b^{-1}(t)FT(w(t)))$ to the transducer so that the signal wavelet in the form of w(t) will be generated.

Function Decomposition

After the signal or wavelet has been generated in accordance with the above discussion, the signal is transmitted into a body in any conventional manner. Usually, a transmitting and receiving transducer is placed against the bare skin of an individual or displaced from the skin in a water bath. Oftentimes, a coupling enhancer, such as a fluid or gel, is applied to the body prior to the contact with the transducer. Thereafter, the ultrasonic energy signal passes through the body and acoustical impedance interfaces will cause the energy to be reflected. It is these reflections and the time difference between signal transmission and reception that is received by the transducer.

The received signal reflections now must be converted somehow into meaningful forms for the operator. As described above, typical techniques to process the received reflections involved Fourier transformation. However, the present invention uses a new processing technique that takes advantage of the unique and beneficial qualities of the Letcher Wavelet ($L^M$) to create a representation of improved quality. The preferred transformation techniques will be described herein below.

Given a vector of $N(=2^J)$ data values $[f_1, \ldots, f_N]\equiv F$, representing the function, f. The data values are evenly spaced on a unit interval. The goal is to split this vector F into its components at different scales, indexed by j. At each new level the mesh width is cut in half and the number of wavelet coefficients is doubled. The composition is $$f = f^\phi + f^{(0)} + f^{(1)} + \ldots + f^{(J-1)} + f^{err} \tag{25}$$

$$f^{(j)} = \sum_{k=1}^{2^j} b_{jk} 2^{-j/2} W_{jk}(x) = \sum_{k=1}^{2^j} b_{jk} W(k - 2^j x) \tag{26}$$

and $$f^\phi(x) = b_\phi \phi(1 - x) \tag{27}$$

$$f^{err} = \sum_{j=J}^{\infty} \sum_{k=1}^{2^j} b_{jk} W(k - 2^j x) \tag{28}$$

Note that $f_{err}=0$ at x=any of the sampled points. The detail $f^{(j)}$ is a combination of $2^j$ wavelets at scale $2^{-j}$. $f^\phi$ is a multiple of the scaling function, $\phi$.

The wavelet transformation will accept a vector of N data values, F, and produce a vector of N values, B plus a vector of length N−1, A. The inverse transformation will accept a vector of N values, B, and produce a vector N values, F, plus a vector of length N−1, A. The first element of a is identical to the first element of B; therefore, it is redundant. Please note that both the transform and its inverse will produce the detail vector A.

Algorithms that perform forward and inverse transformations are well known to those skilled in the art. For example, take four sets of matrices $^nE$, $^nH$, $^nE^*$ and $^nH^*$ which are defined such that $$(^nE)_{ij} = C_{2i-j}/2 \tag{29}$$

$$(^nE^*)_{ij} = C_{2i-j} \tag{30}$$

$$(^nH)_{ij} = (-1)^{j+1} C_{j+1-2i}/2 \tag{31}$$

$$(^nH^*)_{ij} = (-1)^{j+1} C_{j+1-2i} \tag{32}$$

Figure 4:
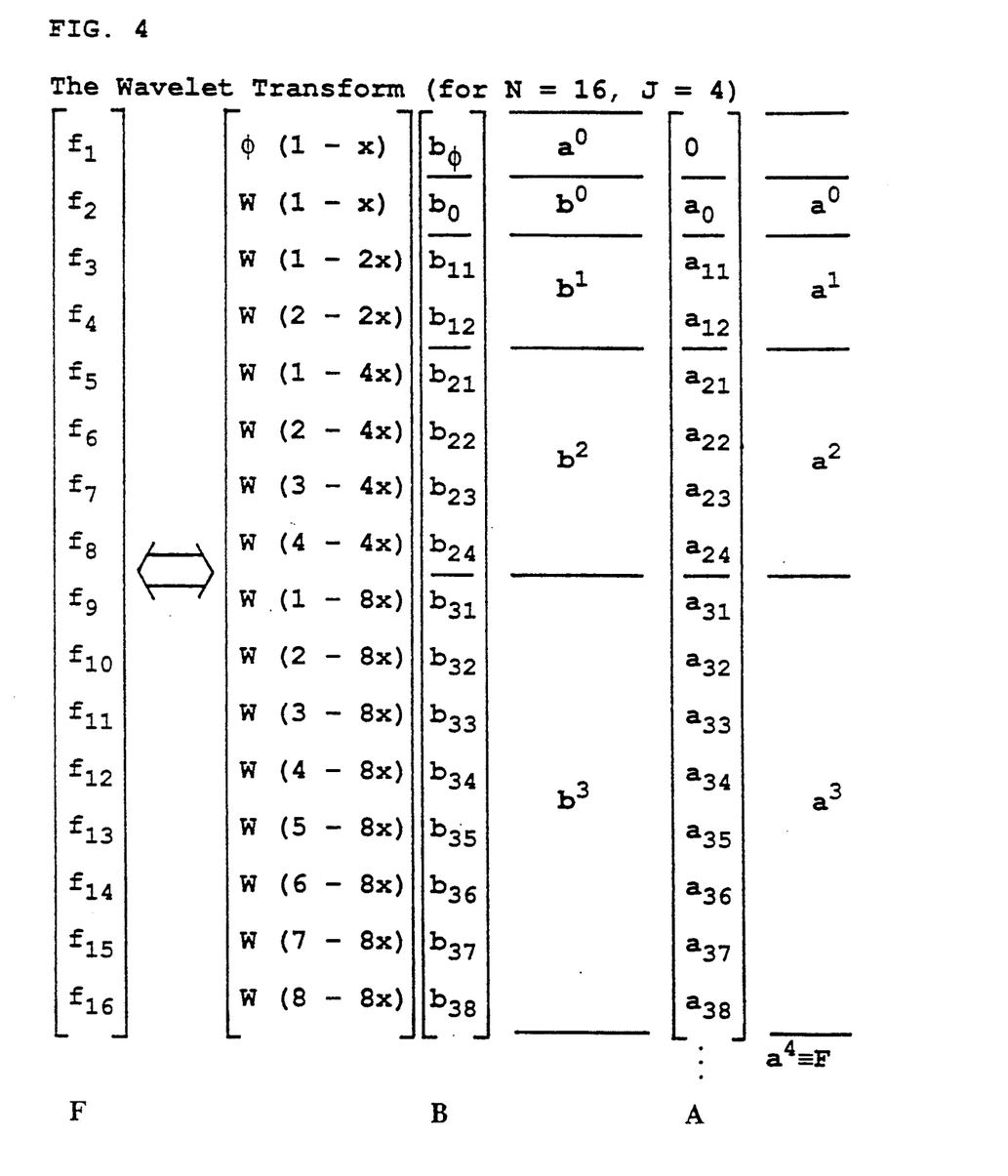
FIG. 4 is a graphical representation of a wavelet transformation.

Please refer to FIG. 4 for a graphical representation of these.

The preceding superscript n denotes the size or dimensionality of the matrix. That is to say that $^nE$ is an l by 2 l matrix where $2l=2^n$; i.e., $^3E$ is 4 by 8. For the D4 wavelet the matrices E and H are shown in FIG. 4. As the dimensionality is increased, it is done by repeating, thereby increasing the pattern to the right and down. Notice the orphan two terms in row 1 of E and row 1 of H.

The matrices $^nE^*$ and $^nH^*$ are the transposes of $^nE$ and $^nH$ except that the factor of ½ is not present.

Because of the properties imposed on the set $\{C_n\}$ given in Eqns. 15, 16, and 17, it can be shown that for each n, $$^nE^nE^* = ^nH^nH^* = 1 \text{ which is } 1\times 1 \tag{33}$$

$$^nE^{*n}E + ^nH^{*n}H = 1 \text{ which is } 2\,1\times 2\,1 \tag{34}$$

$$^nH^nE^* = ^nE^nH^* = 0 \text{ which is } 1\times 1 \tag{35}$$

that is, if, unlike all prior transformation techniques, a multiplicative factor is introduced, γ, to the orphan terms in each matrix the needed properties will result. Here, for the above relations to hold, $$\gamma = 2/(C_0^2 + C_1^2) = 1.0717839 \tag{36}$$

Figure 5:
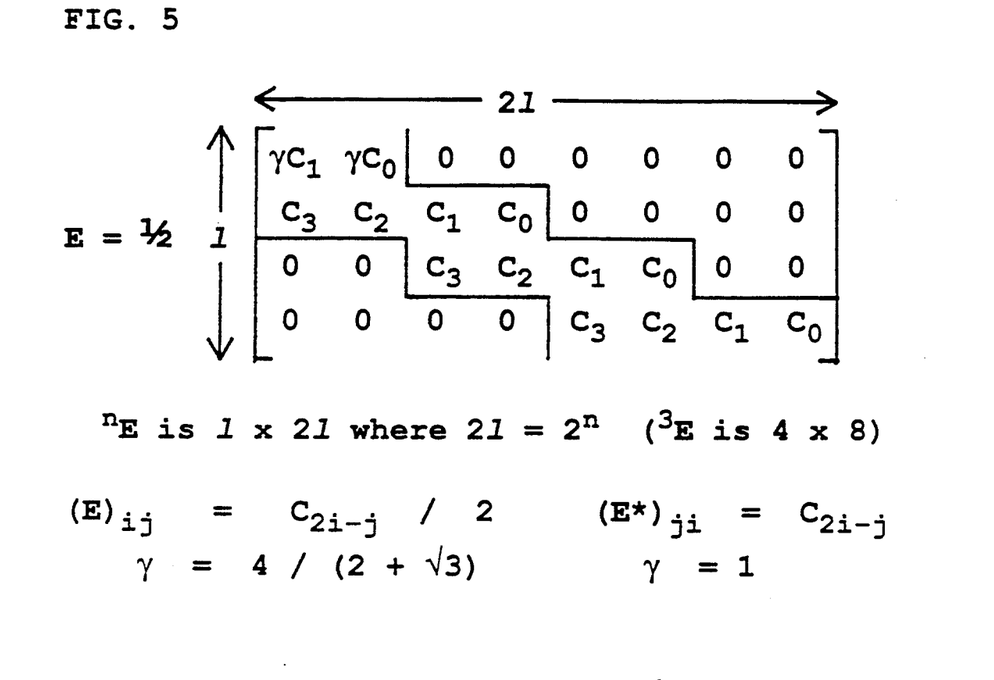
FIG. 5 is a graphical representation of a E and H matrices for a $D_4$ wavelet.
Figure 6:
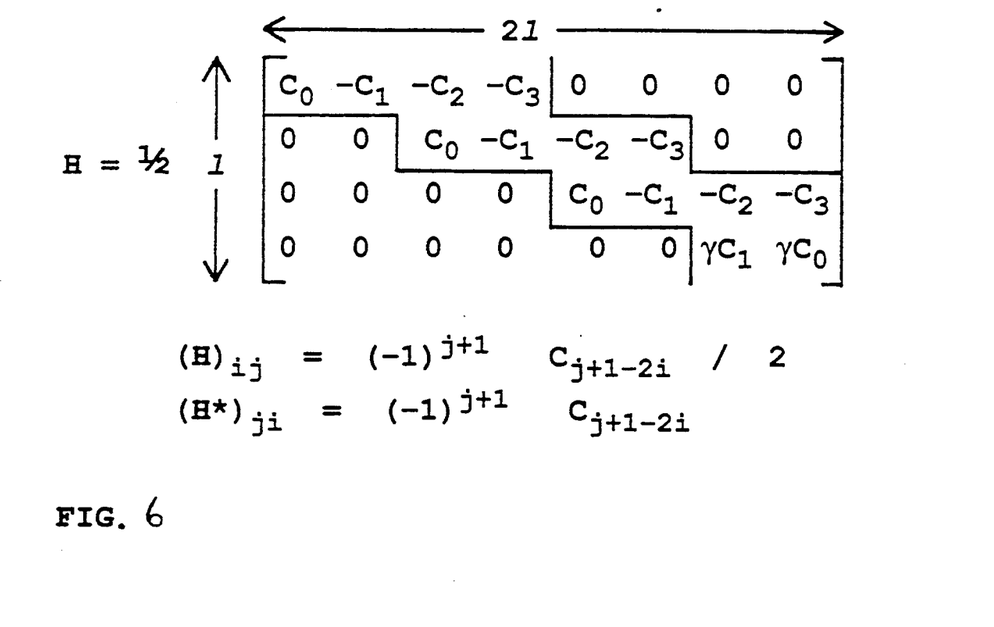
FIG. 6 is a graphical representation of a E and H matrices for a $D_4$ wavelet, as used in the practice of the present invention.
Figure 7:
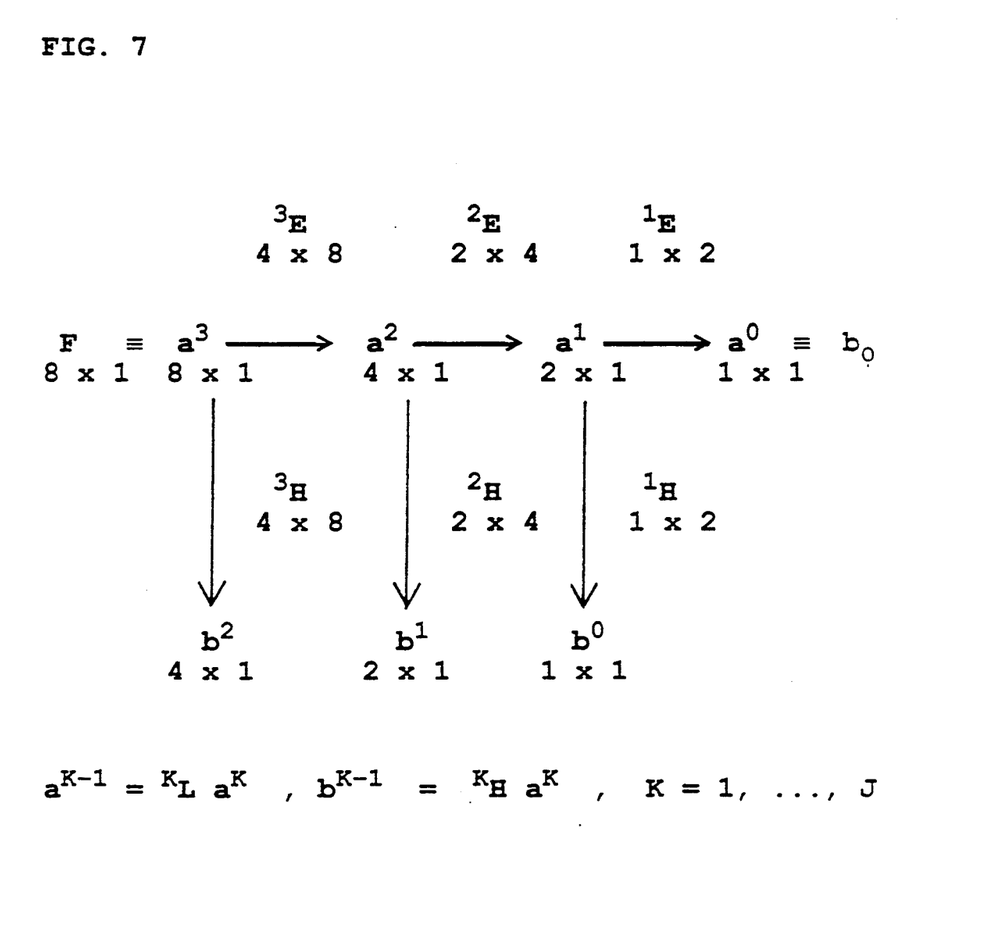
FIG. 7 is a graphical representation of a E and H matrices combined into single arrays A and B, as used in the practice of the present invention, by a forward transform algorithm.

These matrices are shown diagrammatically in FIGS. 5 and 6.

The forward wavelet transformation algorithm is shown schematically in FIG. 6. Starting with a linear array F which is 1×1 (and is defined to be $A^n$, $n=2^J$), then two arrays, $A^{n-1}$ and $B^{n-1}$ can be calculated by the process $$A^{n-1} := ^nLA^n \tag{37}$$

and $$B^{n-1} := {}^n H A^n \qquad (38)$$

This process is repeated until $n-1=1$. Then the arrays $^nA$ and $^nB$ are accumulated into single arrays A and B.

Another benefit of the transformation process of the present invention is that the computational burden is cut in half over that of prior transformation processes. This decimation accounts for the order (N $\log_2$ N) behavior of the algorithm. This ease of computation means that an image can be processed more quickly and/or less expensive CPU's can now be used and still be capable of generating acceptable to improved images.

Figure 8:
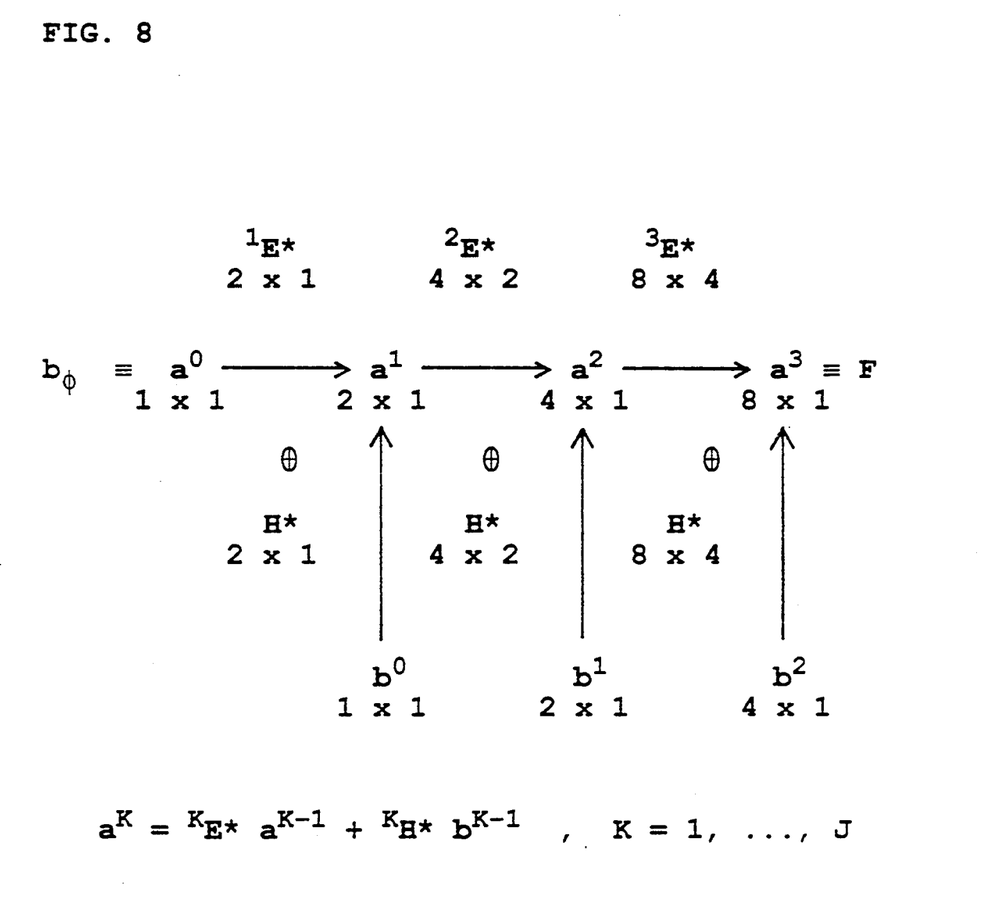
FIG. 8 is a graphical representation of E and H matrices of FIG. 6 transformed using a reverse transform algorithm, as used in the practice of the present invention.

The inverse wavelet transform uses the matrices E* and H* as shown in FIG. 8. The single B array is used selectively to calculate a new set of $A^n$ arrays. Finally, the array F is obtained.

$$A^{n+1} := {}^n E^* A^n + {}^n H^* B^n \qquad (39)$$

$$F = A^k, \qquad (40)$$

where k is the final value of n

One can visualize the action of both the forward and inverse transformation in FIG. 4. The large arrow pointing to the right indicates that the F is transformed into an array A and B. The inverse transformation uses only the B array to calculate both the F and A arrays. The A array is automatically calculated in either form of the transformation. The functions listed immediately to the left of the B array in FIG. 4 are the basis functions which correspond to the coefficients in the B array.

The $D_4$ wavelet transformation algorithm above described has been experimentally implemented by the inventor hereof into a software form that takes advantage of the architecture of the Cyrix Corporation EMC87 memory mapped high speed coprocessor to a 80386 computer, both of which are commercially available.

Interpretation of the A and B Arrays

Given a set of data values, $F_i$, $i=1, \ldots, N$. $F_i$ is the sampled value of F at the value of $x_i$. The $x_i$ values are evenly spaced on the unit interval; i.e., $x_{i+1} - x_i = 1/N$.

A set of N functions, $\{\Psi_j\}$ are chosen which exhibit orthogonality and normalization. So, a set of coefficients so that the function F is expressed as a linear combination of the basis functions; that is, $$F_i = F(x_i) = (F)_i = \sum_{k=1}^{N} b_k \psi_k (x_i), i=1, \ldots, N \qquad (41)$$

For the wavelet transformation, $\Psi_1 = \phi(1-x)$, $\Psi_2 = W(1-x)$, $\Psi_3 = W(1-2x)$, $\Psi_4 = W(2-2x)$, etc. The array B is calculated so that $(B)_k = b_k$. There are N coefficients as F is real.

The discrete complex Fourier Transformation is defined in an identical way except that the basis functions are defined as $$\Psi_k = (2\pi)^{-\frac{1}{2}} \cos(2\pi k n x) \qquad (42)$$

$$\Psi_{k+1} = (2\pi)^{-\frac{1}{2}} \sin(2\pi k n x) \qquad (43)$$

The basis functions are sinusoids with sine-cosine pairs each at different frequencies. Notice that for an N point Fourier transform, 2N basis functions are required because the function to be transformed is complex and it is sampled to yield N real and N imaginary point values.

If one views the wavelet basis functions each as a single cycle sinusoid which is nonzero only over one cycle, then the approximate wavelets could be:

$$\Psi_1 = \phi(1-x) = \text{a constant},$$
$$\Psi_2 = W(1-x) = \sin[2\pi(1-x)], \text{ etc.}$$

Notice that there are only $v$ different "sequencies" ($N = 2^v$), N/2 of the highest sequency, N/4 of the next lower, etc. The N/2 basis functions of the highest sequency are such that the number of the ordered set is displaced one from the other by exactly one cycle.

The interpretation of the B array is straightforward: N functions have been chosen as a set of basis functions of a space into which F shall be projected. The elements of the array B are the fraction of the function F represented by each basis function. By limiting the number of basis functions to a small (finite) number, the class of functions that can be represented exactly is limited. In the fourier transform, the basis functions that are not used are all sinusoids of frequency greater than the maximum listed in Eqn 42 and 43 by letting $n=N-1$. This gives rise to aliasing and the Gibbs phenomenon if the sampled signal contains frequencies greater than one half of the sampling frequency (the Nyquist frequency). In the case of the wavelet transformation, those basis functions which are not used are those of higher sequency than those employed, i.e., of higher order dilations.

The A array can be broken into a sequence of subarrays of progressively larger size. The first array has a length of one, the second has a length of two, the next four, etc. Each of these subarrays can be interpreted as being what the F array would become if all higher order sequencies (corresponding to the sequencies of the respective B elements) were removed. That is, the highest order subarray of A is the array F with the highest frequency removed, the next subarray is the array F with the highest two sequencies removed, etc. If one views this as a form of low pass filter, a sequence of successive applications of low pass filters is identically the A array.

The Imaging Device

The imaging device that is preferred for use with the present invention will be described in detail herein below. However, a background is provided first for ease of understanding of the benefits and requirements of the present invention. Consider a directed beam of sound the magnitude of the intensity of which is a time reversed wavelet of sequency, j. At first glance, what one would expect to find is a sequence of wavelets which are translates of each other, one for each reflection boundary. The time for receipt is the time of flight of the sound. Some slight wavelet broadening may be expected; however, one assumes that the broadening will be the same form in all media under investigation. Altering the sampling time of the received signal to account for this broadening is a part of the "tuning" of the device. The received signal should be a combination of translates of a single wavelet, the strength of which is proportional to the expression $(Z_2 - Z_1)/(Z_2 + Z_1)$. If desired, this can be corrected for absorption due to nonzero $\mu$. The algorithm is described below. The received signal is given by $$R = I_0 e^{-2\mu|x|} (Z_2 - Z_1)/(Z_2 + Z_1) + \qquad (44)$$

$$I_0 e^{-2[\mu_1 x_1 + \mu_2 x_2]} (Z_3 - Z_2)/(Z_3 + Z_2) +$$

$$I_0 e^{-2[\mu_1 x_1 + \mu_2 x_2 + \mu_3 x_3]} (Z_4 - Z_3)/(Z_4 + Z_3) + \ldots$$

When the received signal is transformed by a forward wavelet transform, the only B array terms that are non-zero are those for the levels j and j−1. The B values give a map of the reflections.

The part (lower half) of the array B is an 1 by N/2 array that is converted (using this array and other values within B by the interpolation theorem into a 1 by N array called R. This is a direct map of the reflections and the magnitudes (if all absorption coefficients are assumed to be zero) are proportional to the $(Z_2-Z_1)/(Z_2+Z_1)$ terms of Eqn 44. These reflection coefficients, R, are evenly spaced on the interval of measurement.

Consider now an array Z which is calculated from R by $$(Z)_i = (Z)_{i-1} + (k.i) R_i \tag{45}$$

Assuming that the material being imaged is identical at the beginning of the scan (i=1) to that at the end (i=N), then k is selected so that $Z_N = Z_1$. This compensates, approximately and efficiently, for nonzero absorption coefficients. Eqn 45 converts the map of the reflection coefficients directly into a map of acoustical impedances (density times velocity of sound). Clearly, $Z(x_{max})$ should be $Z(x_{min})$, else absorption has not been properly accounted for.

The imaging described herein will work for any degree of wavelet i.e., for M=2,4, ... The computational burden in performing the transform is directly proportional to the number of nonzero coefficients, M, therefore it should be desirable to use the lowest order wavelet possible. However, as a general rule, the higher the order of the wavelet, the easier it is to generate the time reversed transmitted signal. For human body imaging, M=2 or M=4 has been found to be preferable.

For practical reasons, it may not be possible to generate a pure wavelet as the transmitted signal; however, one can correct for this as follows.

Given an orthonormal basis $\Psi_n$, n=1, ..., N, if the transmitted signal L is given by $$L = \sum_{j=1}^{m} d_j \psi_j \tag{46}$$

where $d_j = 0$ unless, $1 \leq j \leq m$, then the reflected signal, R, can be expressed by $$R = \sum_{k=1}^{N} b_k \psi_k = \sum_{k=1}^{N} b_k^1 \sum_{j=1}^{m} d_j \psi_{k+j-1} \tag{47}$$

Multiply by $\Psi_i$ and integrate $$\int R \psi_i dx = \sum_{k=1}^{N} b_k \int \psi_k \psi_i dx = b_i \tag{48}$$

We now have $$b_i = \sum_{k=1}^{N} b_k^1 \sum_{j=1}^{m} d_j \int \psi_{k+j-1} \psi_i dx \tag{49}$$

The above integral vanishes unless j=i−k+1, because the $\Psi$'s are orthonormal. Therefore, $$b_i = \sum_{k=1}^{N} b_k^1 d_{i-k+1} \tag{50}$$

The values of $b_i$ are the elements of the 1×1 array B which is obtained by performing a wavelet transformation on the signal. It is now possible to define an 1×1 matrix D such that $$(D)_{ij} = d_{i-j+1} \tag{51}$$

Therefore, $$B = DB^1 \tag{52}$$

where B is known, D is measured, and $B^1$ is the "pure" A-scan that is desired. One can multiply Eqn 52 by $D^T$ and define a matrix $S = D^T D$ $$D^T B = D^T D B^1 = SB^1 \tag{53}$$

S is positive definite, therefore, there exists an orthogonal matrix U that diagonalizes S. This is, $$U S U^T = S_D \tag{54}$$

where $S_D$ is a diagonal matrix.

Since U is orthogonal, $U U^T = U^T U = 1$, so $$D^T B = U^T U S U^T U B^1 = U^T S_D U B^1 \tag{55}$$

Premultiplying both sides of Eqn 55 by U, $$S_D U B^1 = U D^T B \tag{56}$$

So, $$U B^1 = S_D^{-1} U D^T B \tag{57}$$

and, $$B^1 = [U^T S_D^{-1} U D^T] B \tag{58}$$

Finally, we may define $$G = U^T S_D^{-1} U D^T \tag{59}$$

Given a commercially available pulse generation circuit and a transducer, one skilled in the art can measure D and then to calculate the matrix, G, once, and the multiplication can be carried out after each wavelet transformation.

Also, because of the precise imaging potential of the $L^M$ wavelet and transformation process above described, it has been found desirable to use a finely focused beam of ultrasonic energy rather than a wider beam. For example, a beam angle of less than about 10 degrees has been found to be suitable. A beam angle greater than this will work but the image quality decreases markedly. Most preferable, is a beam angle of less than about 3 degrees.

The resulting reflection represent an A-scan or a one-dimensional form of the acoustical impedances of the body materials. Commercially available software exists to "move" the beam of ultrasonic energy between a sequence of A-scans to produce the two-dimensional B-scan. Further, the C-scan is easily produced, since it is a map of a plane orthogonal to the A-scans, by methods well known to those skilled in the art.

Imaging Process

The received signals are transformed in accordance with the above transformation algorithm into a form representative of the acoustical impedances of the body materials. This information or data can be provided to the operator as numbers or it can be provided in a graphical form on a CRT or in hard copy. Usually, the signal representations will be provided to the operator in an image form such as from an oscilloscope or on a CRT, where the image corresponds to the body material interfaces, as are all well known in the art. Further, the signals can be transformed into numerical values, graphs or images of the density of the materials or the velocity of the sound through the body materials, again as are well known to those skilled in the art.

Figure 14:
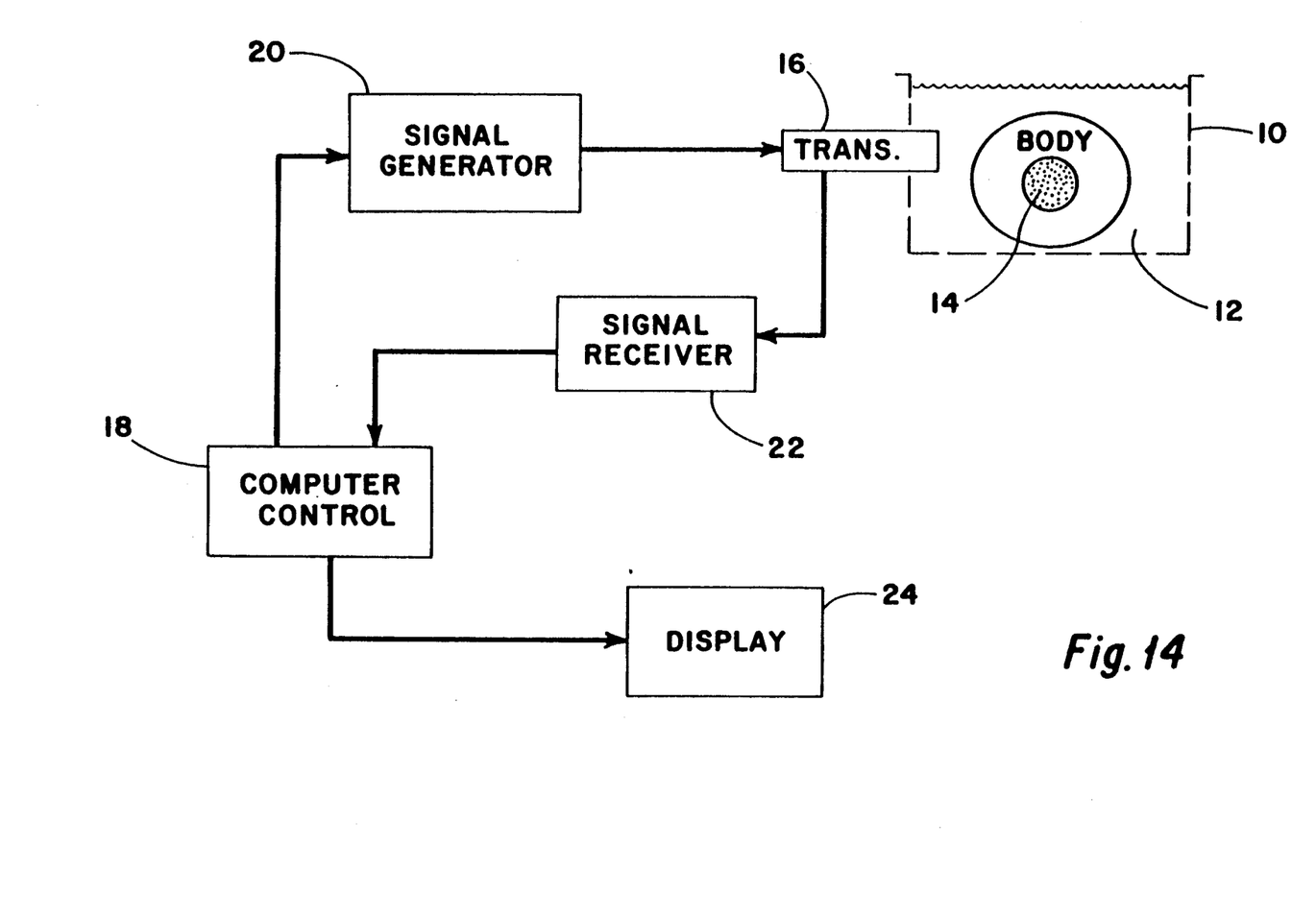
FIG. 14 is a block diagram of a system for reflective ultrasonic imaging, in accordance with one preferred embodiment of the present invention.

FIG. 14 shows in block diagram form a system for reflective ultrasonic imaging, wherein a dish 10 holds water 12 within which is placed a body 14 to be imaged. An ultrasonic transducer 16 is brought into operative association or contact with the body 14. A computer 18, acting as the system controller, provides the electrical control to cause a signal generator 20 to send an electrical signal to the transducer 16 to create a wavelet in the specific shape, as previously discussed. The wavelet(s) passes through the water 12 and into the body 14 where portions of the ultrasonic energy are reflected back towards the transducer 16. These reflections are received at the transducer 16, passed through a signal receiver 22 to the computer 18. The reflections are therein transformed, in accordance with the specific transformation process discussed previously, and passed to a display 24, such as a hard copy or CRT.

The above described invention was experimentally reduced to practice in the following manner. Wavelet generation was accomplished by a digital pulse generated by a computer command in a 33 mhz 80386 CPU equipped with a Cyrix EMC87 coprocessor. This CPU was connected in a well known manner to a SCI Wavelet Generator/Receiver Circuit Card that sent the signal to a Panametrics 500PR Pulse Receiver, connected in turn to a Panametrics 2.5 Mhz V305SU F=3.0"ultrasonic transducer. The same transducer was used for sending and receiving. The signal was passed to the SCI Wavelet Generator/Receiver Circuit Card that stored the data in 8 bit evenly spaced points starting at the same time that a command was issued to transmit the $L^M$ wavelet.

An SCI MRI Coupler Card in the computer's CPU asked for the full transfer of the received data to RAM. The CPU then performed the single wavelet correction calculation, and a forward wavelet transformation on selected parts of the data, thereby the data of a single scan line was obtained which were the reflection coefficients. The reflection coefficients were then integrated to produce a map of acoustical impedances (density times velocity of sound) of the body materials. The transducer was physically moved to produce another scan line, with the set of obtained scan lines producing a rectangular image that was viewed directly as reflection coefficients or integrated to produce a map of acoustical impedances.

Figure 9:
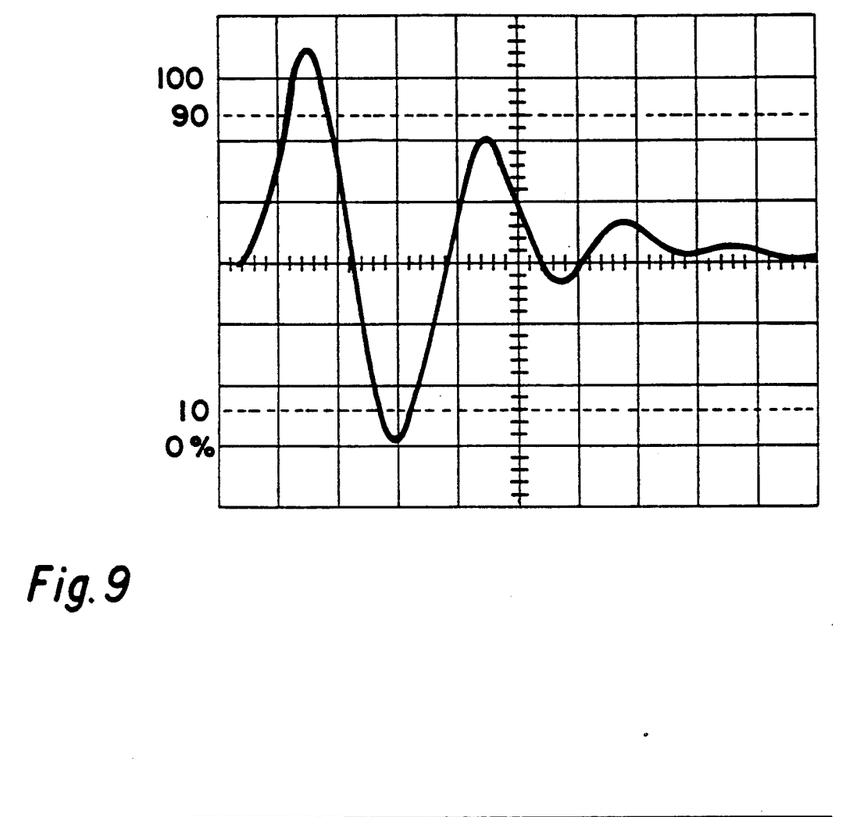
FIG. 9 is a photographic image of an oscilloscope showing the shape of an ultrasonic signal to be transmitted.
Figure 10:
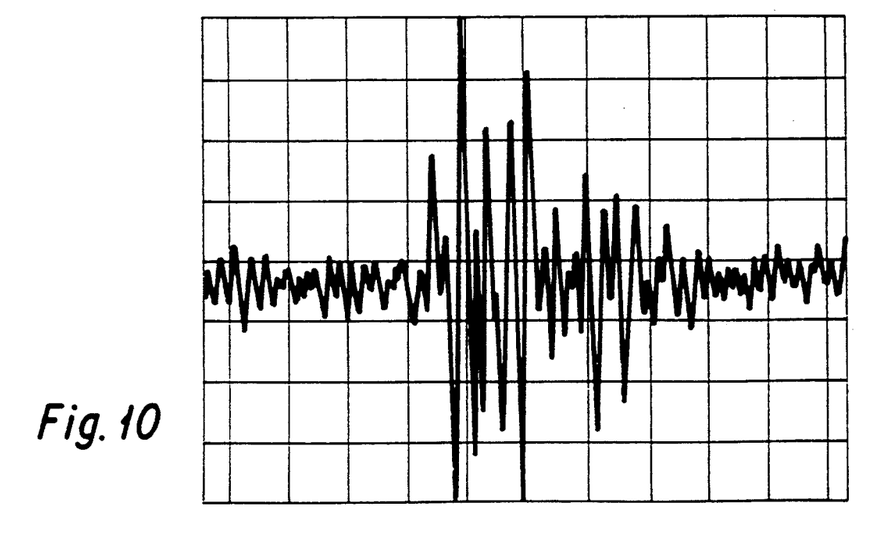
FIG. 10 is a photographic image of an oscilloscope showing the received reflection from a tomato within a dish of water; the reflection being created by conventional techniques.
Figure 11:
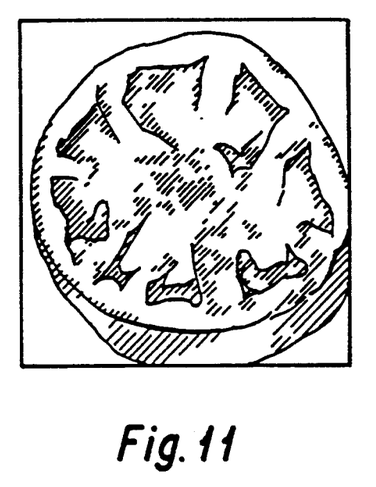
FIG. 11 is a photograph of the cross section of a tomato.
Figure 12:
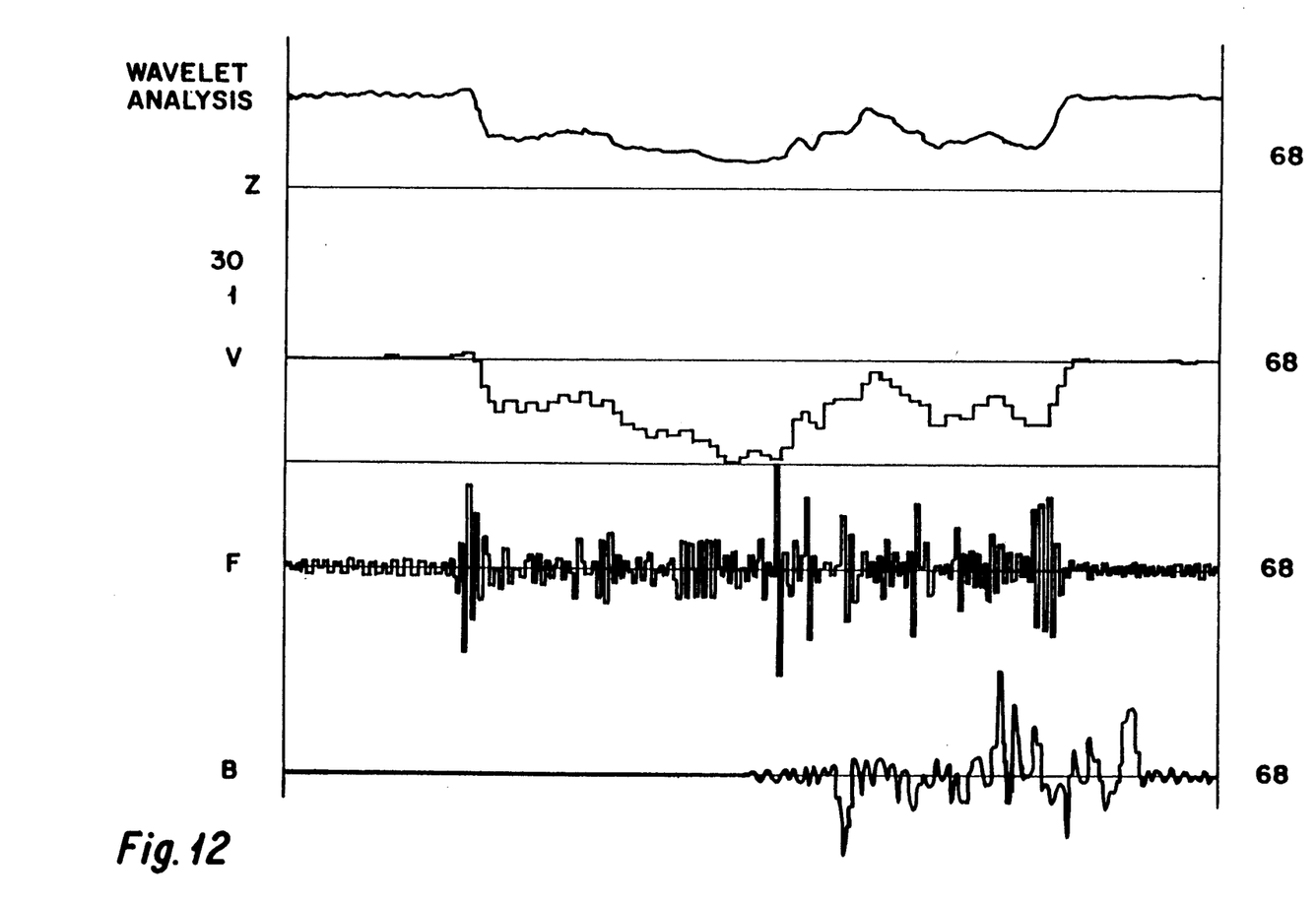
FIG. 12 contains the plots of the calculated values of the received ultrasound signal, F, the value of the B array obtained by applying the wavelet transformation on F and the calculated value of the impedance, V. The line chosen is shown by the two white bars on either side of the image in FIG. 11.
Figure 13:
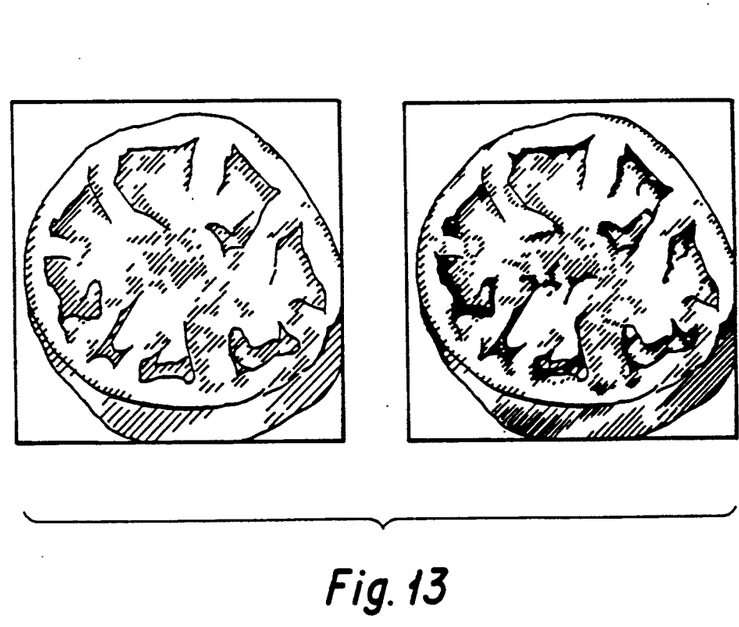
FIG. 13 contains two images. The image on the left is a defined image of impedances where the brightness value is proportional to the impedance. The image on the right is the image that has been obtained by applying the techniques of this patent.

To dramatically illustrate the benefits of using the prevent invention to produce images of a quality better than that of the prior methods, a conventional ultrasonic imaging device was used to generate the signal thought to be in the form shown in FIG. 9, which was transmitted into a tomato in a dish of water, to create the image of the reflected signal of FIG. 10. As can be understood from the above discussions, the signal sent out most likely was not the signal shown in FIG. 9. More importantly, the image shown in FIG. 10 has a very poor signal-to-noise ratio so that no internal structure of the tomato can be differentiated. FIG. 11 is a photograph of a cross section of a tomato. The white bars on either side of the image show the line along which an impedance function Z is measured. The impedance is defined to be proportional to the measured density. This single line is shown in the plot labeled Z in FIG. 12. From the signal Z, the received ultra sound signal is calculated by well known techniques which are given herein and is displayed in FIG. 12 by the plot labeled F. The wavelet transformation was applied to this function, F and the resulting B array plot is shown. From the B array, above, using the techniques described herein, a calculated impedance is obtained and shown as the plot labeled V. Excellent agreement between Z and V can be observed. The above procedure was carried out on all 256 scan lines of the image shown on the left in FIG. 13. The image on the right shown in FIG. 13 is the results of these calculations. Perfect agreement is not obtained. It should be noted that the absolute value of the impedances are not calculated, rather only the relative values. Therefore, the absolute magnitude and gradient have been chosen by the author.

Wherein the present invention has been described in reference to the above described embodiments, it should be understood that other and further modifications, apart from those shown or suggested herein, may be made within the scope and spirit of the present invention.

What is claimed is:

1. A method of producing a representation of acoustical impedances of materials within a body, comprising:

(a) introducing at least one wavelet of ultrasonic energy into a body, the wavelet having the shape defined as a solution to:

$$W(x) = \sum_{n=0}^{M-1} (-1)^n C_n \phi (2x - 1 + n),$$

where W is an amplitude of the wavelet at a time (x), $\phi$ is a function of time (x), M is a defined even positive integer, n is a summation index taking all integer values between 0 and $M-1$, each $C_n$ is a number, and where the function $\phi$ and each coefficient $C_n$ are a solution to the dilation equation:

$$\phi(x) = \sum_{n=0}^{M-1} C_n \phi (2x - n);$$

(b) receiving reflections of the introduced ultrasonic energy from body material interfaces; and (c) transforming the received reflections, utilizing coefficient $C_n$ with the same values as used in step (a) to create the wavelet, to produce a representation of acoustical impedances for the body materials.

2. The method of claim 1 wherein in Steps (a) and (b) a piezoelectric transducer is brought adjacent the body for introducing and receiving the ultrasonic energy.

3. The method of claim 2 wherein the ultrasonic energy is introduced into the body with a beam angle of less than 10 degrees.

4. The method of claim 3 wherein the beam angle is less than 3 degrees.

5. The method of claim 1 and further comprising:
   (d) from the representation, generating a display of sonic velocities of the body materials.

6. The method of claim 1 and further comprising:
   (d) from the representation, generating a display of densities of the body materials.

7. The method of claim 1 and further comprising:
   (d) from the representation, generating a visual image of body material interfaces.

8. A system for producing a representation of acoustical impedances of materials within a body, comprising:
   (a) means of generating at least one wavelet of ultrasonic energy for transmission into a body, the wavelet having the shape defined as a solution to:

$$W(x) = \sum_{n=0}^{m-1} (-1)^n C_n \phi(2x - 1 + n),$$

where W is an amplitude of the wavelet at a time (x), $\phi$ is a function of time (x), M is a defined even positive integer, n is a summation index taking all integer values between 0 and M−1, each $C_n$ is a number, and where the function $\phi$ and each coefficient $C_n$ are a solution to the dilation equation:

$$\phi(x) = \sum_{n=0}^{m-0} C_n \phi(2x - n);$$

(b) means for receiving reflections of introduced ultrasonic energy from body materials; and
   (c) means for transforming received and reflections, utilizing coefficients $C_n$ with the same values as used in the means for generating the wavelet, to produce a representation of acoustical impedances for the body materials.

9. The method of claim 1 wherein step (b) further comprises receiving the reflections and storing the reflections in a linear array (F) representative of amplitudes of the reflections; and step (c) further comprises multiplying the linear array (F) by matrices, the elements of the matrices being in terms of values of sets of coefficients $C_n$ only, where n=0,1,2, . . . ,M−1, to produce a map of reflection coefficients.

10. The system of claim 8 wherein the means for receiving reflections further comprising means for receiving the reflections and storing the reflections in a linear array (F) representative of amplitudes of the reflections; and the means for transforming received reflections further comprising means for multiplying the linear array (F) by matrices, the elements of the matrices being in terms of values of sets of coefficients $C_n$ only, where n=0,1,2, . . . ,M−1, to produce a map of reflection coefficients.

* * * * *